US012766717B2

(12) United States Patent
Imanishi

(10) Patent No.: US 12,766,717 B2
(45) Date of Patent: Oct. 20, 2026

(54) ROBOT CONTROL DEVICE, NUMERICAL CONTROL SYSTEM, AND NUMERICAL CONTROL METHOD

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 105 days.

(21) Appl. No.: 18/851,140

(22) PCT Filed: Apr. 18, 2022

(86) PCT No.: PCT/JP2022/018072
§ 371 (c)(1),
(2) Date: Sep. 26, 2024

(87) PCT Pub. No.: WO2023/203617
PCT Pub. Date: Oct. 26, 2023

(65) Prior Publication Data
US 2025/0256398 A1 Aug. 14, 2025

(51) Int. Cl.
*B25J 9/16* (2006.01)

(52) U.S. Cl.
CPC ........... *B25J 9/1658* (2013.01); *B25J 9/1674* (2013.01)

(58) Field of Classification Search
CPC ...... B25J 9/1658; B25J 9/1674; B25J 9/1602; G05B 2219/36242; G05B 19/41825; G05B 19/4155
See application file for complete search history.

(56) References Cited

U.S. PATENT DOCUMENTS

2015/0346714 A1* 12/2015 Takahashi .......... G05B 19/4155 700/19
2021/0286340 A1* 9/2021 Nagata ............... G05B 19/4155
2022/0011754 A1* 1/2022 Sagasaki .......... G05B 19/41835

FOREIGN PATENT DOCUMENTS

DE 10 2017 000 864 A1 8/2017
DE 10 2019 129 041 A1 4/2020
(Continued)

OTHER PUBLICATIONS

WO-2021049028-A1 Description Translation (Year: 2021).*
International Search Report issued in PCT/JP2022/018072, mailed Jun. 28, 2022.

*Primary Examiner* — Khoi H Tran
*Assistant Examiner* — Trang Dang
(74) *Attorney, Agent, or Firm* — Studebaker Brackett PLLC

(57) ABSTRACT

Provided is a robot control device making it possible to implement interlocking control with a numerical control device that has a plurality of control systems. A robot control device is provided with: a program input unit; an analysis unit for analyzing the robot control program, and acquiring a read command and a write command with which are set a variable of a numerical control program for controlling a numerical control device and system information for identifying a control system from among the plurality of control systems of the numerical control device; a system setting unit for outputting a command for reading/writing a variable of the control system; and a data communication unit for transmitting the command for reading/writing the variable of the control system, thereby causing the numerical control device to update the variable of the control system.

9 Claims, 7 Drawing Sheets

(56) References Cited

FOREIGN PATENT DOCUMENTS

| | | | | | |
|---|---|---|---|---|---|
| DE | 10 2020 204 118 | A1 | | 10/2020 | |
| DE | 10 2018 206 241 | B4 | | 11/2020 | |
| DE | 11 2019 006 613 | T5 | | 9/2021 | |
| DE | 11 2021 003 517 | T5 | | 5/2023 | |
| JP | 2010-277425 | A | | 12/2010 | |
| JP | 2018-124910 | A | | 8/2018 | |
| JP | 2021-009480 | A | | 1/2021 | |
| WO | WO-2021049028 | A1 | * | 3/2021 | ......... G05B 19/4061 |
| WO | 2022/054245 | A1 | | 3/2022 | |

* cited by examiner

FIG. 5

```
MACHINE PROCESSING REQUEST

1:LABEL [1]
2:CALL WR_CNC_MACRO('MACHINE1',1,101,1)
3:CALL WR_CNC_MACRO('MACHINE1',2,101,1)
4:LABEL [2]
5:WAIT 10.0sec
6:CALL RD_CNC_MACRO('MACHINE1', 1,101,1)
   IF REGISTER [1] = ON, JUMP LABEL 2
7:LABEL [3]
8:WAIT 1.0sec
9:CALL RD_CNC_MACRO('MACHINE1', 2,101,2)
   IF REGISTER [2] = ON, JUMP LABEL 3

[END]
```

FIG. 6

```
<CUSTOM MACRO VARIABLE ALLOTMENT EXAMPLE>

#100 : PROGRAM STOP REQUEST    0: REQUEST OFF/1: REQUEST ON
#101 : MACHINING REQUEST       0: REQUEST OFF/1: REQUEST ON
#102 : DOOR OPEN REQUEST       0: REQUEST OFF/1: REQUEST ON
#103 : DOOR CLOSE REQUEST      0: REQUEST OFF/1: REQUEST ON
#104 : CHUCK OPEN REQUEST      0: REQUEST OFF/1: REQUEST ON
#105 : CHUCK CLOSE REQUEST     0: REQUEST OFF/1: REQUEST ON
...
```

FIG. 7

```
<MAIN PROGRAM>
O0001
N10
IF[#101 EQ 1] GOTO20;
IF[#102 EQ 1] GOTO30;
IF[#103 EQ 1] GOTO40;
IF[#104 EQ 1] GOTO50;
IF[#105 EQ 1] GOTO60;
IF[#100 EQ 1] GOTO100;

...
N20 M98 P1000;
GOTO10;
N100
M30;
```

```
<SUB PROGRAM>
O1000
G00 X2=100. Z1=100;
G01 Z1=0. F1000;

#101 = 0 (REQUEST OFF)
M99;
```

FIG. 8

```
<MAIN PROGRAM>
O0002
N10
IF[#101 EQ 1] GOTO20;
IF[#102 EQ 1] GOTO30;
IF[#103 EQ 1] GOTO40;
IF[#104 EQ 1] GOTO50;
IF[#105 EQ 1] GOTO60;
IF[#100 EQ 1] GOTO100;

...
N20 M98 P2000;
GOTO10;
N100
M30;
```

```
<SUB PROGRAM>
O2000
G00 X1=200. Z2=0;
G01 Z2=1000. F1000;

#101 = 0
M99;
```

ROBOT CONTROL DEVICE, NUMERICAL CONTROL SYSTEM, AND NUMERICAL CONTROL METHOD

CROSS-REFERENCE TO RELATED APPLICATION(S)

The present application is a U.S. National Stage Application under 37 C.F.R. § 371 of International Patent Application No. PCT/JP2022/018072 filed on Apr. 18, 2022, the disclosure of which is herein incorporated by reference in its entirety.

BACKGROUND

1. Field

The present disclosure relates to a robot control device, a numerical control system, and a numerical control method.

2. Description of Related Art

Conventionally, a system has been constructed which connects the respective controllers of a machine tool, robot, etc. in order to automate a processing machine. Patent Document 1 and Patent Document 2 are examples of documents relating to this kind of technology.

Patent Document 1 describes that, in a numerical control device, a comparative relationship between parameters related to settings of the numerical control device is stored in a comparative relationship storage unit, data having a comparative relationship is extracted from among parameters related to settings of the numerical control device based on the comparative relationship stored in the comparative relationship storage unit, and the data having this comparative relationship is displayed on a display unit to be associated with each other.

Patent Document 2 describes that, in a machining system including a machine controller and a robot controller, the machine controller includes a communication unit configured so as to read setting data and a robot operation program corresponding to a machining type set by a setting unit from a storage unit, and transmit the setting data and the robot operation program to the robot controller, when a determination unit determines that a mobile robot is arranged at a predetermined position adjacent to a machining device.

CITATION LIST

Patent Document

Patent Document 1: Japanese Unexamined Patent Application, Publication No. 2021-009480

Patent Document 2: Japanese Unexamined Patent Application, Publication No. 2018-124910

SUMMARY

Problems to be Solved by the Invention

However, in a system including a robot and a machine tool, a robot control device that controls the robot may interlock operation of the robot and the machine tool by reading/writing macro variables of the machine tool. For example, the robot control device may perform processing such that acquires the operation state by turning on an operation request to the machine tool through the macro variable, and reading the macro variable of the machine tool, and turns off the operation request when the operation state reaches operation completion, and then proceeds to the next sequence. However, since there is no concept of a control system of a machine in a conventional robot control apparatus, it is not possible to interlock operation with an existing machine constituted by a plurality of groups of tool posts and spindles such as a multifunction machine tool via macro variables.

An object of the present disclosure is to provide a robot control device, a numerical control system, and a numerical control method capable of realizing interlocking control with a numerical control device having a plurality of control systems without complicating the control.

Means for Solving the Problems

As aspect of the present disclosure relates to a robot control device which includes: a program input unit which acquires a robot control program for controlling a robot from a storage unit; an analysis unit which analyzes the robot control program inputted from the program input unit, and acquires a read command and a write command in which a variable of a numerical control program controlling a numerical control device and system information specifying a target system from a plurality of control systems possessed by the numerical control device are set; a system setting unit which outputs a command for reading and writing a variable of the target system based on information acquired by the analysis unit; and a data communication unit which causes update of the variable of the target system to be executed in the numerical control device, by transmitting a command for reading and writing the variable of the target system to the numerical control device.

Additionally, an aspect of the present disclosure relates to a numerical control system which includes: a numerical control device having a plurality of control systems; and a robot control device which interlocks with the numerical control device to controls a robot, in which the robot control device includes: a program input unit which acquires a robot control program for controlling a robot from a storage unit; an analysis unit which analyzes the robot control program inputted from the program input unit, and acquires a read command and a write command in which a variable of a numerical control program controlling the numerical control device and system information specifying a target system from a plurality of control systems possessed by the numerical control device are set; a system setting unit which outputs a command for reading and writing a variable of the target system based on information acquired from the analysis unit; and a data communication unit which transmits a command for reading and writing a variable of the target system to the numerical control device, and in which the numerical control device executes update of the variable of the target system based on a command for reading and writing a variable of the target system received from the robot control device.

Furthermore, an aspect of the present invention relates to a numerical control method for interlock controlling a robot control device and a numerical control device with each other, the numerical control method including: a program input step of acquiring a robot control program for controlling a robot from a storage unit; an analysis step of analyzing the robot control program inputted in the program input step, and acquiring a read command and a write command in which a variable of a numerical control program controlling the numerical control device and system information specifying a target system from a plurality of control systems possessed by the numerical control device are set; a system setting step of outputting a command for reading and writing a variable of the target system based on information acquired in the analysis step; and an updating step of the robot control device causing update of a variable of the target system to be executed in the numerical control device, by transmitting a command for reading and writing the variable of the target system to the numerical control device.

Effects of the Invention

According to the present disclosure, it is possible to provide a robot control device, a numerical control system, and a numerical control method capable of realizing interlocking control with a numerical control device having a plurality of control systems without complicating the control.

BRIEF DESCRIPTION OF THE DRAWINGS

FIG. 5 is a diagram showing an example of a robot control program of the robot control device;

FIG. 6 is a diagram showing an allotment example of custom macro variables of a numerical control program updated by the robot control device;

FIG. 7 is a diagram showing an example of a main program and a sub program of the system 1;

FIG. 8 is a diagram showing an example of a main program and a sub program of the system 2.

DETAILED DESCRIPTION OF THE EMBODIMENTS

Hereinafter, an embodiment of the present disclosure will be described in detail with reference to the drawings.

Figure 1:
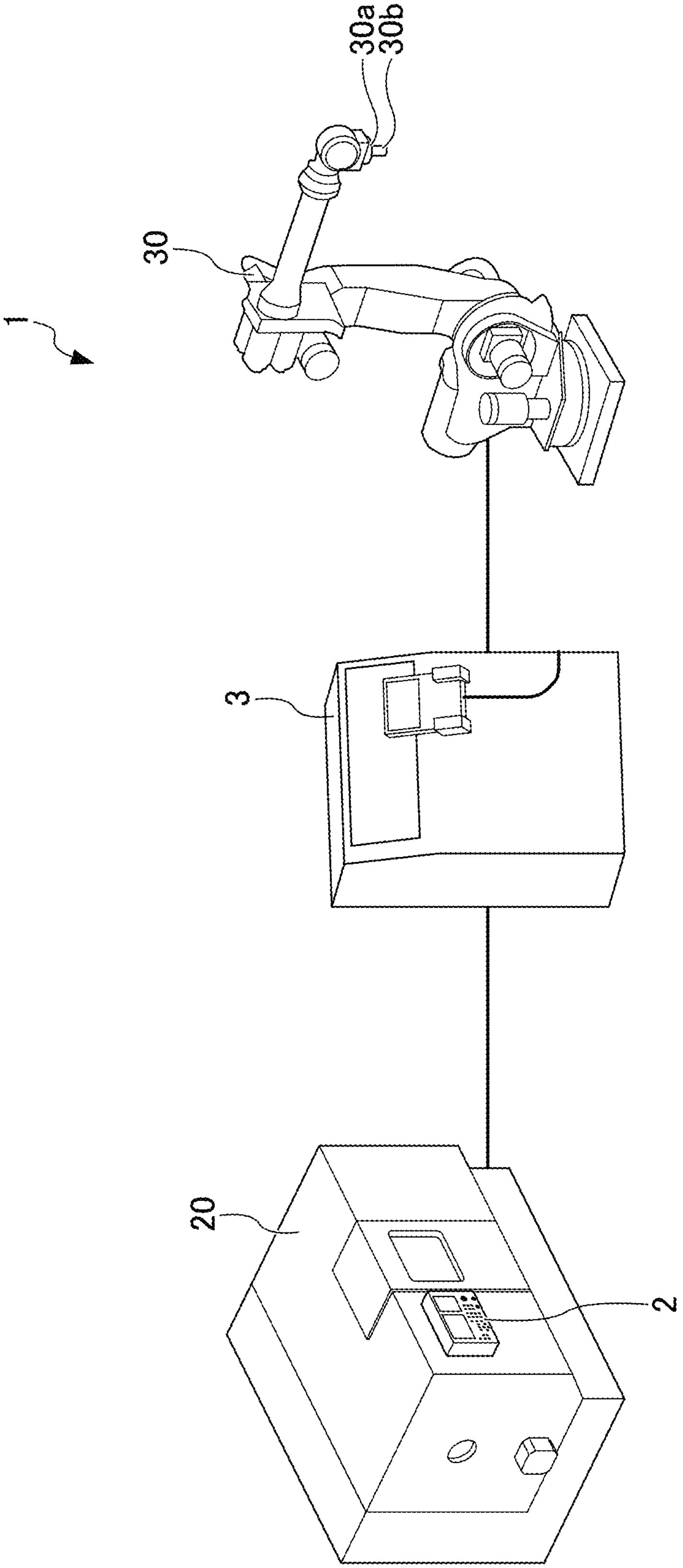
FIG. 1 is a schematic diagram of a numerical control system according to an embodiment of the present disclosure.

FIG. 1 is a schematic diagram of a numerical control system 1 according to an embodiment of the present disclosure.

The numerical control system 1 includes a numerical control device (CNC) 2 that controls a machine tool 20, and a robot control device 3 that is communicably connected to the numerical control device 2 and controls a robot 30 provided in the vicinity of the machine tool 20. The numerical control system 1 according to the present embodiment interlinks to control the operations of the machine tool 20 and the robot 30 by using the numerical control device 2 and the robot control device 3 which are communicably connected to each other. The numerical control device 2 generates machine tool command signals which are commands for the machine tool 20 according to a predetermined numerical control program, and transmits these signals to the machine tool 20.

The machine tool 20 machines a workpiece (not shown) in accordance with machine tool command signals transmitted from the numerical control device 2. The machine tool 20 is, for example, a composite machining device having a turret, a table, a tool post, a spindle, and the like. The machine tool 20 may be a composite machining device established by combining a lathe, a ball mill, a milling machine, a grinding machine, a laser processing machine, an injection molding machine, and the like as appropriate.

The robot 30 operates under control by the robot control device 3, and executes predetermined work on the workpiece machined inside of the machine tool 20, for example. The robot 30 is, for example, an articulated robot, and a tool **30*b* for gripping, processing, or inspecting a workpiece is attached to an arm tip portion 30*a* thereof. Hereinafter, a case establishing the robot 30 as a six-axis articulated robot will be described; however, the present invention is not limited thereto. Hereinafter, a case establishing the robot 30** as a six-axis articulated robot will be described; however, the present invention is not limited thereto.

Figure 2:
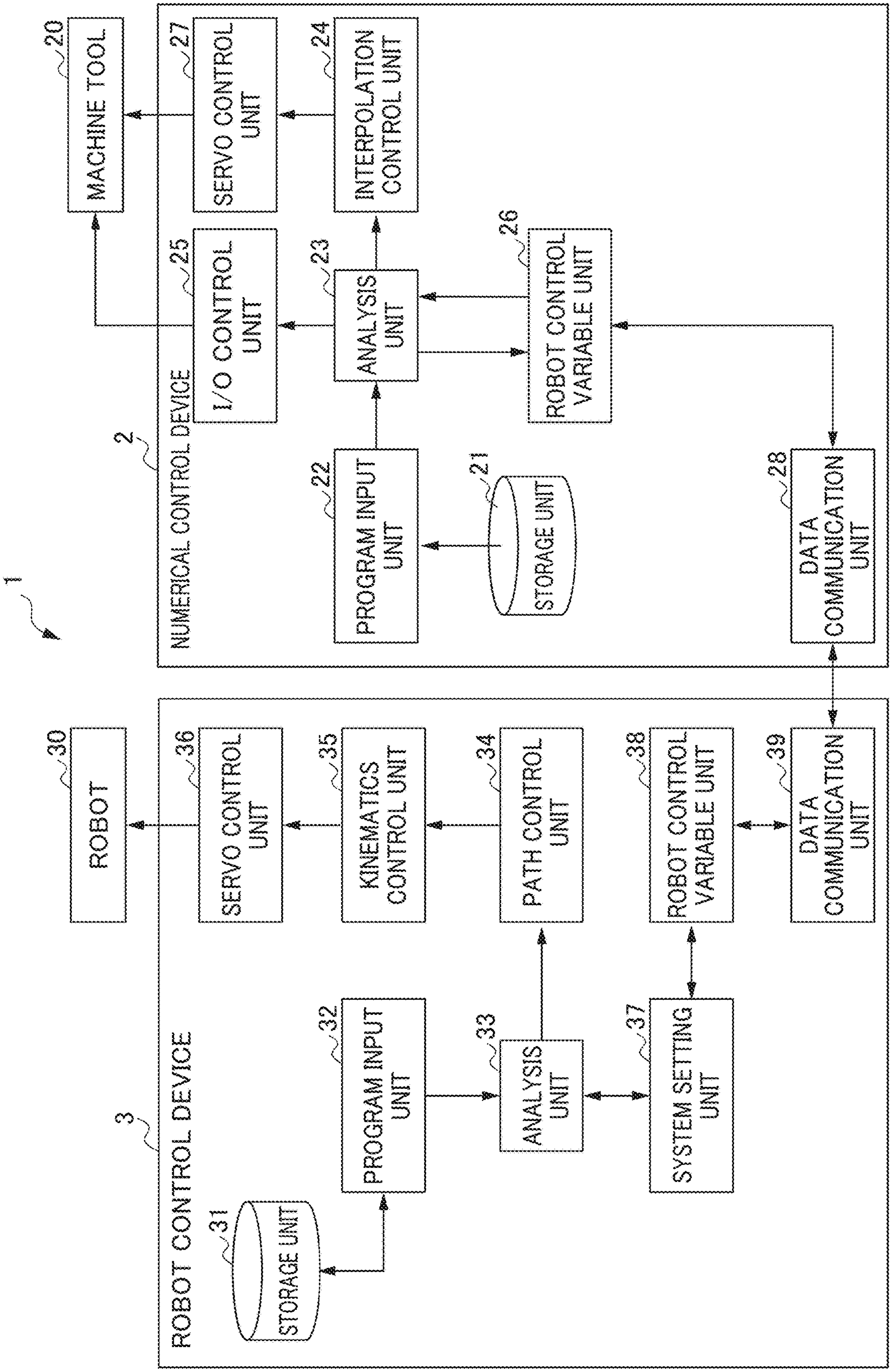
FIG. 2 is a functional block diagram of a robot control device and a numerical control device according to an embodiment of the present disclosure.

FIG. 2 is a functional block diagram of the robot control device 3 and the numerical control device 2 according to an embodiment of the present disclosure.

The numerical control device 2 and the robot control device 3 are each computers respectively configured by hardware such as an arithmetic processing unit such as a CPU (Central Processing Unit), an auxiliary storage unit such as an HDD (Hard Disk Drive) or an SSD (Solid State Drive) storing various computer programs, a main storage unit such as RAM (Random Access Memory) for temporarily storing the data necessary for the arithmetic processing unit to execute the computer programs, an operation unit such as a keyboard on which an operator performs various operations, and a display unit such as a display for displaying various information to the operator. The numerical control device 2 and the robot control device 3 can transmit and receive various signals to and from each other by Ethernet (registered trademark), for example.

First, the configuration of the numerical control device 2 will be described. The numerical control device 2 realizes a machine tool control function of controlling the operation of the machine tool 20 to be interlocked with the operation of the control axis of the robot 30 by the above-described hardware configuration. More specifically, in order to realize these functions, the numerical control device 2 includes a storage unit 21, a program input unit 22, an analysis unit 23, a robot control variable unit 26, an I/O control unit 25, an interpolation control unit 24, a servo control unit 27, a data communication unit 28, and the like.

The storage unit 21 stores numerical control programs. The numerical control program is created based on operations by an operator, for example. The numerical control program is configured by a plurality of command blocks, etc. related to the machine tool 20 for controlling operation of the machine tool 20. The numerical control program is written in a known program language such as G code or M code.

It should be noted that various kinds of information other than the numerical control programs are also stored in the storage unit 21. The various kinds of information include, for example, machine coordinate values, robot coordinate values, and robot teaching positions.

The machine coordinate values are values indicating positions of various axes of the machine tool 20 operated under the numerical control program (that is, positions of a tool post, table, etc. of the machine tool 20). The machine coordinate values are defined under a machine tool coordinate system having a reference point defined at an arbitrary position on the machine tool 20 or in the vicinity of the machine tool 20 as an origin. The latest values of the machine coordinate values, which sequentially change under the numerical control program, are sequentially updated by processing (not shown) so as to be stored in the storage unit 21.

The robot coordinate values are values indicating the position and posture of a control point of the robot 30 (for example, the arm tip portion 30*a* of the robot 30) operated under the control of the robot control device 3, in other words, the position of each control axis of the robot 30. The robot coordinate values are defined under a robot coordinate system which differs from the machine tool coordinate system, as described above. The robot coordinate system is a coordinate system having a reference point defined at an arbitrary position on the robot 30 or in the vicinity of the robot 30 as an origin. Hereinafter, a case where the robot coordinate system is different from the machine tool coordinate system will be described. The robot coordinate system may coincide with the machine tool coordinate system. In other words, the origin or the coordinate axis direction of the robot coordinate system may coincide with the origin or the coordinate axis direction of the machine tool coordinate system. In addition, the robot coordinate system can be switched between two or more coordinate formats having different control axes. More specifically, in the numerical control program, the position and posture of the control points of the robot 30 can be specified by Cartesian coordinate format or respective axis coordinate formats. The latest values of the robot coordinate values that sequentially change under the numerical control program are sequentially updated by the robot coordinate values acquired from the robot control device 3 by processing (not shown), so as to be stored in the storage unit 21.

The robot teaching positions are teaching positions such as a start point and an end point of the robot 30 input by an operator, specifically, a teaching position of the robot 30 input from a teach pendant or the like, a teaching position input such as from a keyboard, or the like. The teaching positions of the robot 30 include robot coordinate values indicating the positions of each control axes of the robot 30.

The program input unit 22 reads the numerical control program from the storage unit 21, and sequentially inputs this to the analysis unit 23. In addition, the program input unit 22 reads various kinds of information such as the machine coordinate values, the robot coordinate values, and the robot teaching positions stored in the storage unit 21, and inputs the information to the analysis unit 23.

The analysis unit 23 analyzes the command classification based on the numerical control program input from the program input unit 22 for each command block, and acquires information on the custom macro variable from the robot control variable unit 26. The analysis unit 23 outputs, to the interpolation control unit 24 and the I/O control unit 25, a command for controlling the machine tool 20 based on the analysis result of the numerical control program and the custom macro variable. Hereinafter, the custom macro variable will be described as a variable.

In the present embodiment, when the robot control variable is updated, the analysis unit 23 outputs, to the interpolation control unit 24 and the I/O control unit 25, a command for operating the target system, based on the information specifying the system.

The interpolation control unit 24 is connected to the servo control unit 27, and performs interpolation control for linear interpolation, arc interpolation, helical interpolation, etc. through the servo control unit 27. The servo control unit 27 generates machine tool control signals for controlling the operation of the machine tool 20, and inputs the machine tool control signals to the actuators that drive various axes of the machine tool 20. The machine tool 20 operates in accordance with machine tool control signals to machine a workpiece (not shown). After controlling the operation of the machine tool 20 according to the numerical control program, the aforementioned machine coordinate values are updated with the latest machine coordinate values.

The robot control variable unit 26 analyzes the commands in the machining program read and written from the robot control device 3, and updates the variable.

The data communication unit 28 transmits and receives various commands and data to and from the data communication unit 39 of the robot control device 3.

Next, the configuration of the robot control device 3 will be described in detail. As illustrated in FIG. 2, in order to control the operation of the robot 30, the robot control device 3 includes a storage unit 31, a program input unit 32, an analysis unit 33, a path control unit 34, a kinematics control unit 35, a servo control unit 36, a system setting unit 37, a robot control variable unit 38, a data communication unit 39, and the like.

The storage unit 31 stores various kinds of information such as the robot control program. The robot control program is created based on operations by an operator, for example. The robot control program is configured by a plurality of command blocks, etc. for the robot 30 for controlling the operation of the robot 30. The various kinds of information include, for example, machine coordinate values, robot coordinate values, and robot teaching positions.

The program input unit 32 reads the robot control program from the storage unit 31, and inputs the robot control program to the analysis unit 33.

The analysis unit 33 determines a command classification of the robot control program inputted. The analysis unit 33 transmits commands of an operation plan based on the analysis results to the path control unit 34.

When the commands of the operation plan are input from the analysis unit 33, the path control unit 34 calculates time-series data of control points of the robot 30, and outputs the time-series data to the kinematics control unit 35.

The kinematics control unit 35 calculates a target angle of each joint of the robot 30 by inverse kinematics calculation based on the time-series data inputted, and outputs the target angles to the servo control unit 36. Herein, the inverse kinematics calculation of the robot 30 is a calculation method of calculating the angle of each joint from the implement position and posture of the robot 30.

The servo control unit 36 generates robot control signals for the robot 30 by feedback-controlling each servo motor of the robot 30 so that the target angles inputted from the kinematics control unit 35 are realized, and inputs the robot control signals to the servo motor of the robot 30.

In addition, in the analysis unit 33 of the present embodiment, when the command classification of the inputted robot control program is analyzed as the read/write command of the variable of the numerical control device 2, the target system included in the read/write command is notified from the analysis unit 33.

Figure 3:
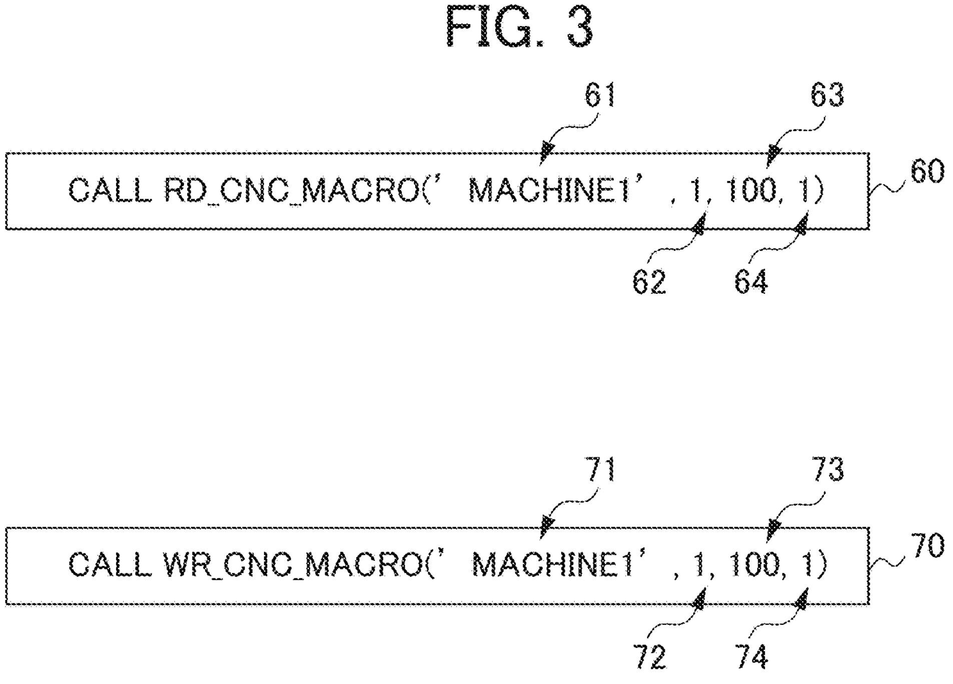
FIG. 3 is a diagram showing an example of a robot control program including a read command and a write command.

The read/write command includes a read command and a write command. FIG. 3 is a diagram illustrating an example of a robot control program including read commands 60 and write commands 70. Each read command 60 has the four parameters of a first argument 61, a second argument 62, a third argument 63, and a fourth argument 64. The first argument 61 indicates a machine to be a target of the read command 60, and is "MACHINE1" in this example. The second argument 62 is a system number (system information) for specifying which system from among a plurality of systems, and is "1" in this example. The third argument 63 is a macro variable number for specifying a target macro variable, and is "100" in this example. The fourth argument 64 indicates an address for storing the read value, and is "1" in this example.

Similarly, each write command 70 also has the four parameters of a first argument 71, a second argument 72, a third argument 73, and a fourth argument 74. The first argument 71 indicates a machine that is a target of the write command 70, and is "MACHINE1" in this example. The second argument 72 is a system number (system information) for specifying which system from among a plurality of systems, and is "1" in this example. The third argument 73 is a macro variable number for specifying a target macro variable, and is "100" in this example. The fourth argument 74 indicates a value to be written to the target macro variable, and is "1" in this example.

The system setting unit 37 transmits commands for reading and writing variables of a target system to the robot control variable unit 38, based on the robot control program including the read command 60 and the write command 70.

The robot control variable unit 38 transmits commands for reading and writing variables to the data communication unit 39, based on the commands notified from the system setting unit 37. The data communication unit 39 transmits and receives command signals to and from the data communication unit 28. The commands for reading and writing the variables are transmitted to the robot control variable unit 26 via the data communication unit 28.

Figure 4:
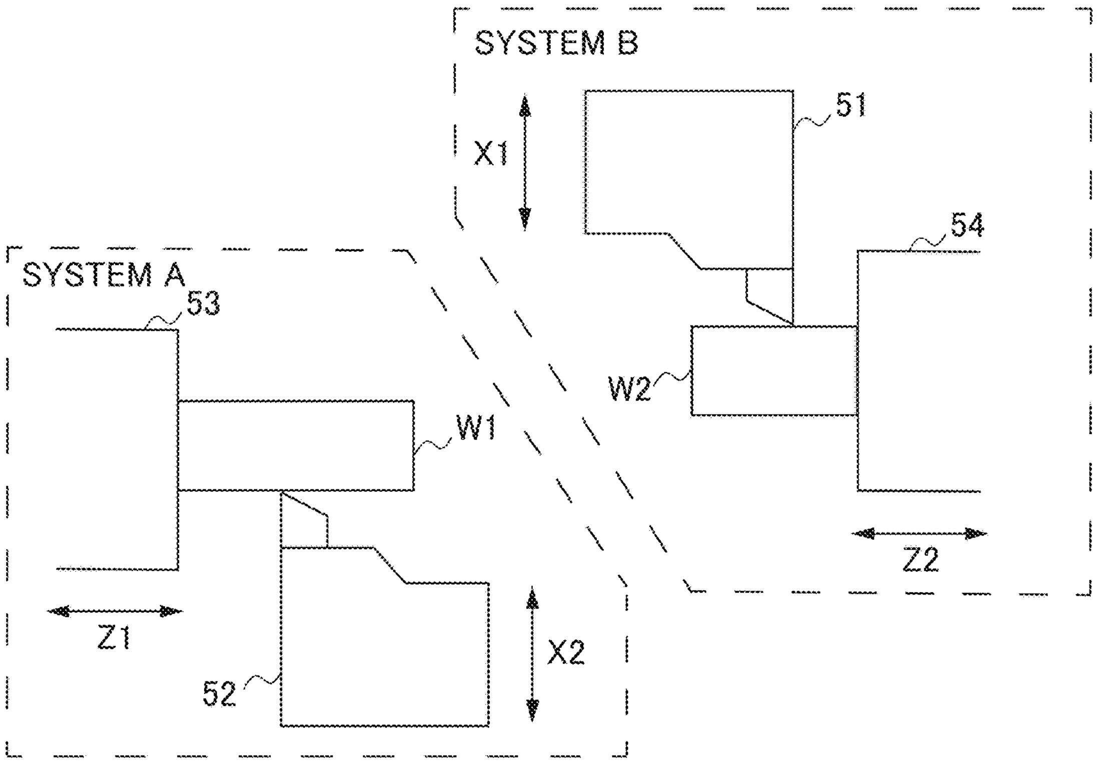
FIG. 4 is a diagram schematically showing a mechanical configuration of each of a system 1 and a system 2.

Next, specific examples of controlling the system 1 and the system 2 will be described with reference to FIGS. 4 to 8. FIG. 4 is a diagram schematically showing the mechanical configurations of each of the system 1 and the system 2. FIG. 4 shows a system 1 which performs machining by a second turret 52 on a workpiece W1 set on the table 53, and a system 2 which performs machining by a first turret 51 on a workpiece W2 set on the table 54.

In FIG. 4, Z1 of the system 1 indicates the z-axis direction, and corresponds to a variable indicating the coordinates in the z-axis direction of the system 1. X2 indicates the x-axis direction, and corresponds to a variable indicating the coordinates in the x-axis direction of the system 1. Similarly, Z2 of the system 2 indicates the z-axis direction, and corresponds to a variable indicating the coordinates in the z-axis direction of the system 2. X1 indicates the x-axis direction, and corresponds to a variable indicating the coordinates in the x-axis direction of the system 2.

FIG. 5 is a diagram illustrating an example of a robot control program input from the program input unit 32 to the analysis unit 33. As shown in FIG. 5, the label [1] is written in the first row. In the second row, "CALL WR CNC_MACRO ('MACHINE1', 1, 101, 1)" is a read command of the system 1, and read processing of the machining start request of the system 1 is performed. In the third row, "CALL WR CNC_MACRO ('MACHINE1', 2, 101, 1)" is a read command of the system 2, and read processing of the machining start request of the system 2 is performed.

In the fourth line, a label [2] is written. In the fifth row of "WAIT 10.0 sec", standby processing for 10 seconds is performed. In the sixth line, "CALL RD_CNC_MACRO ('MACHINE1', 1, 101, 1)" is a write command of the system 1. "IF REGISTER [1]=ON, Jump Label 2" is processing of confirming machining completion of the system 1, and when the condition of "IF REGISTER [1]=ON" is satisfied, the processing transitions to "label 2".

In the seventh line, a label [3] is written. In the eighth line of "WAIT 10.0 sec", standby processing for 10 seconds is performed. In the ninth line, "CALL RD_CNC_MACRO ('MACHINE1', 2, 101, 2)" is a write command of the system 2. "IF REGISTER [2]=ON, Jump Label 3" is processing of confirming the machining completion of the system 2, and when the condition of "IF REGISTER [2]=ON" is satisfied, the processing transitions to the label 3.

As illustrated in FIG. 5, in the robot control program, the systems are distinguished from each other, and the processing of reading and writing variables is performed by the robot control device 3. FIG. 6 is a diagram showing an allocation example of custom macro variables of the numerical control program read and written by the robot control device 3. In the example of FIG. 6, the variable #100 is a variable indicating a program stop request, and #100=0 indicates request OFF, and #100=1 indicates request ON. Furthermore, a variable #101 indicates a processing request, a variable #102 indicates a door opening request, a variable #103 indicates a door closing request, a variable #104 indicates a chuck opening request, and a variable #105 indicates a chuck closing request. In any of the variables #101 to #105, 0 indicates request OFF, and 1 indicates request ON.

Next, with reference to FIGS. 7 and 8, control of the system 1 and the system 2 in a situation in which the variables shown in the example of FIG. 7 are set will be described. FIG. 7 is a diagram showing an example of a main program and a sub program of the system 1. FIG. 7 shows a program of the system 1 called by the robot control program of FIG. 5.

First, control of the system 1 will be described. A conditional branch is set to the sequence number "N10". In the first "IF[#101 EQ 1] GOTO20", when the variable #101=1 is established, the processing transitions to the sequence number "N20". In the sequence number "N20", the sub program O1000 corresponding to the program number 1000 is called and executed by "M98P1000".

In the sub program O1000, the positioning processing is performed based on the coordinates of X2=100 and Z1=100 in "G00". In the positioning processing, processing for linearly moving at a feed speed based on F=1000 to the coordinate of Z1=0 by "G01" is performed. Next, 0 indicating request OFF is input to "#101", and the sub program ends at "M99". After the sub program O1000 ends, the processing returns to the sequence number "N10" at "GOTO10", and the conditional branch processing is repeated.

When #101=1 is not established in the first "IF[#101 EQ 1] GOTO20", the processing transitions to "IF[#102 EQ 1] GOTO30". When #102=1 is established in this "IF[#102 EQ 1] GOTO30", the processing transitions to the sequence number "N30" (not shown), and in the sequence number "N30", although the specific processing is omitted, processing related to the operation of opening the door is executed. When #102=1 is not established in "IF[#102 EQ 1] GOTO30", the processing transitions to "IF[#103 EQ 1] GOTO40". When #103=1 is established in this "IF[#103 EQ 1] GOTO40", the processing transitions to the sequence number "N40" (not shown), and in the sequence number "N40", although the specific processing is omitted, processing related to the operation of closing the door is executed. When #103=1 is not established in "IF[#103 EQ 1]

GOTO40", the processing transitions to "IF[#104 EQ 1] GOTO50". When #104=1 is established in "IF[#104 EQ 1] GOTO50", the processing transitions to the sequence number "N50" (not shown), and in the sequence number "N50", although the specific processing is omitted, processing related to the operation of opening the chuck is executed. When #104=1 is not established in "IF[#104 EQ 1] GOTO50", the processing transitions to "IF[#105 EQ 1] GOTO60". When #105=1 is established in "IF[#105 EQ 1] GOTO60", the processing transitions to the sequence number "N60" (not shown), and in the sequence number "N60", although the specific processing is omitted, processing related to the operation of closing the chuck is executed.

When the determination condition of "IF[#105 EQ 1] GOTO 60" is not satisfied, the determination of "IF[#100 EQ 1] GOTO 100" is performed. When the condition of the determination of "IF[#100 EQ 1] GOTO100" is satisfied, the program is ended by "M30" in the sequence number "N100".

FIG. 8 is a diagram showing an example of a main program and a sub program of the system 2. FIG. 8 shows a program of the system 2 called by the robot control program of FIG. 5. Also in FIG. 8, the same processing as in the example shown in FIG. 7 is performed. The example of FIG. 8 is different in that the subprogram O2000 corresponding to the program number 2000 is called by "M98P2000" in the sequence number "N20".

In the sub program O2000, the positioning processing is performed based on the coordinates of X1=200 and Z2=0 in "G00". In the positioning processing, processing for linearly moving at a feed speed based on F=1000 to the coordinate of Z2=1000 in "G01" is performed. Next, 0 indicating request OFF is input to "#101", and the sub program ends at "M99". After the sub program O2000 ends, the processing returns to the sequence number "N10" at "GOTO10", and the conditional branch processing is repeated.

Figure 9:
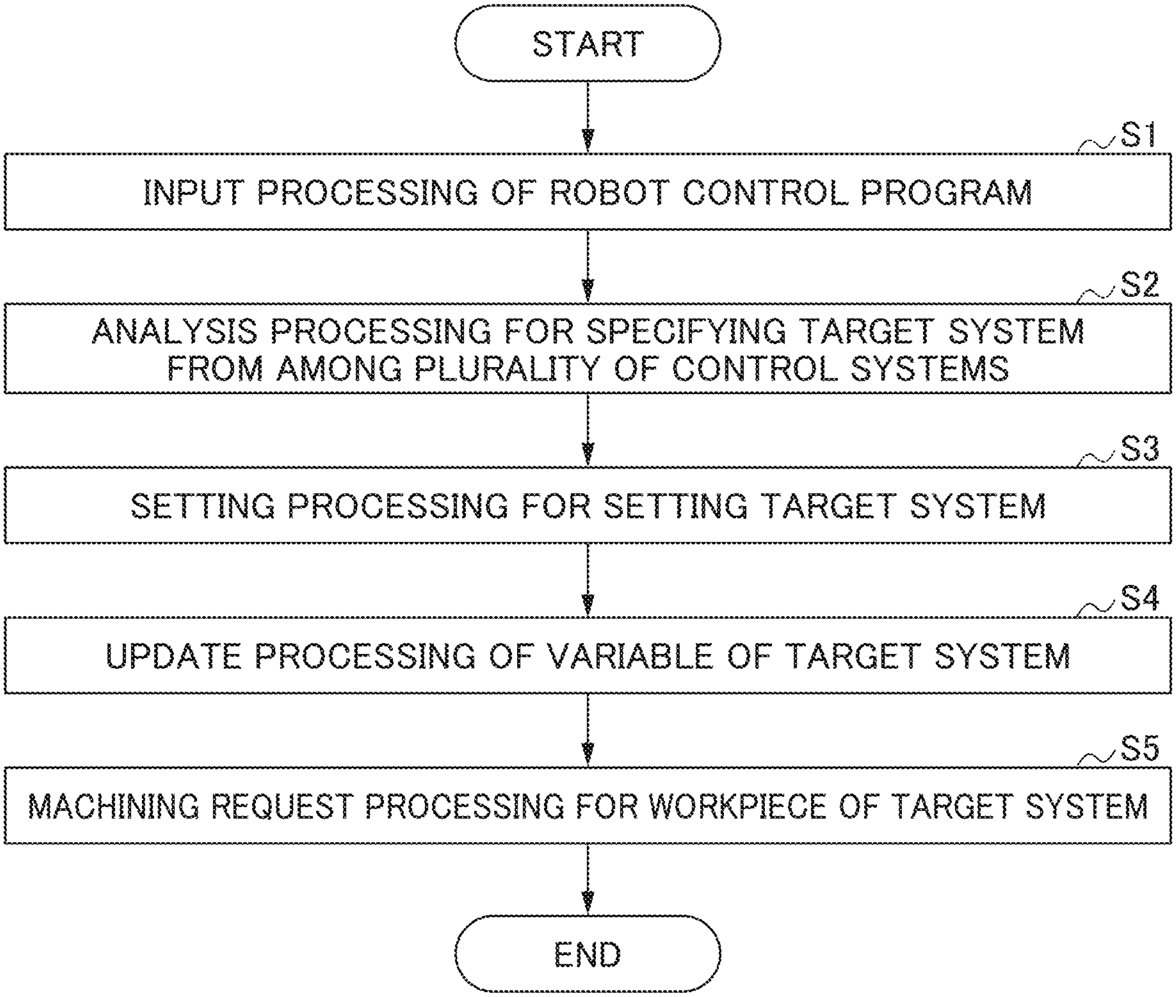
FIG. 9 is a flowchart showing an example of processing of a numerical control system 1 according to an embodiment of the disclosure.

In the example described with reference to FIGS. 8 and 9, the variables #100 to #105 are shared between the system 1 and the system 2. In the configuration of the present embodiment, since the system 1 and the system 2 are distinguished from each other by the command output from the robot control device 3, the system can be specified on the numerical control device 2 side.

Next, the flow of the system selection processing of the numerical control system 1 will be described with reference to FIG. 9. FIG. 9 is a flowchart illustrating an example of processing of the numerical control system 1 according to the embodiment of the present disclosure. FIG. 9 illustrates only an example of the flow of the system selection processing, and other parallel processing shall be omitted.

First, the program input unit 32 of the robot control device 3 reads the robot control program from the storage unit 31, and then executes input processing of inputting the robot control program to the analysis unit 33 (Step S1).

Next, the analysis unit 33 determines a command classification of the input robot control program, acquires system information specifying the system and variables belonging to the system when the command classification is analyzed as a variable read/write command of the numerical control device 2, and executes analysis processing of notifying of the target system to the system setting unit 37 (Step S2).

The system setting unit 37 notified of the target system in Step S2 executes setting processing of outputting, to the robot control variable unit 38, the target system notified from the analysis unit 33 and the variables belonging to the target system (Step S3).

The robot control variable unit 38 transmits the target system and the variables belonging thereto to the data communication unit 28 of the numerical control device 2 by the data communication unit 39, and executes update processing of updating the target system and the variables belonging thereto of the robot control variable unit 26 of the numerical control device 2 (Step S4).

The robot control device 3 executes machining request processing for commanding a target system of the machine tool 20 to perform machining, and the target system of the machine tool 20 performs machining on a workpiece (Step S5). Thus, the present processing is ended.

As described above, the numerical control system 1 of the present embodiment includes the numerical control device 2 having a plurality of control systems, and the robot control device 3 that interlocks with the numerical control device 2 to control the robot 30. Then, the robot control device 3 includes: a program input unit 32 that acquires a robot control program for controlling the robot 30 from the storage unit 31; an analysis unit 33 that analyzes the robot control program input by the program input unit 32, and acquires a read command and a write command in which a variable of the numerical control program for controlling the numerical control device 2 and system information (system number) specifying a target system from a plurality of control systems included in the numerical control device are set; a system setting unit 37 that outputs a command for reading and writing a variable of the target system based on the information acquired by the analysis unit 33; and a data communication unit 39 that causes the numerical control device 2 to update the variable of the target system, by transmitting a command for reading and writing a variable of the target system to the numerical control device 2.

In addition, a numerical control method for controlling the robot control device 3 and the numerical control device 2 to be interlocked with each other according to the present embodiment includes: a program input step of acquiring a robot control program for controlling the robot 30 from the storage unit 31; an analysis step of analyzing the robot control program inputted in the program input step, and acquiring a read command and a write command in which variables of a numerical control program for controlling the numerical control device 2 and system information (system number) specifying a target system from a plurality of control systems included in the numerical control device 2 are set; a system setting step of outputting a command for reading and writing the variable of the target system on the basis of the information acquired in the analysis step; and an update step of the robot control device 3 transmitting a command for reading and writing the variable of the target system to the numerical control device 2, to cause update of the variable of the target system to be executed in the numerical control device 2.

The robot control device 3, the numerical control system 1, and the numerical control method according to the present embodiment exert the following such effects. That is, even in the case of the numerical control device 2 having a plurality of control systems and the variables being shared between each of the control systems, it is possible to distinguish the systems by the robot control device 3, and read and write the variables of the numerical control device 2. Therefore, update of the variables of the target system can be appropriately updated without setting the variables of different systems on the numerical control device 2 side, and the interlocking control of the numerical control device 2 having a plurality of control systems and the robot control device 3 can be appropriately realized without complicating the interlocking control.

In addition, the analysis unit 33 of the robot control device 3 according to the present embodiment outputs a command to perform robot control so as to interlock with a plurality of control systems controlled by the numerical control device 2 based on the updated variables of the target system.

It is thereby possible to appropriately perform interlocking of the numerical control device 2 having a plurality of control systems and the robot control device 3. Furthermore, in the present embodiment, each of the plurality of control systems (system A and system B) controls at least one of the tool post, the turret, the table, and the spindle so as to machine a workpiece, and at least one of the tool post, the turret, the table, and the spindle is controlled based on the variables of the target system updated by the numerical control device 2. In the present embodiment, the first turret 51, the second turret, the table 53, and the table 54 are control targets.

Accordingly, since each of the plurality of control systems includes at least one of the tool post, the turret, the table, and the spindle, it is possible to realize efficient creation of a control program using variables, even in a case where various controls are set.

The present disclosure is not limited to the above embodiment, and various modifications and variations are possible.

EXPLANATION OF REFERENCE NUMERALS

- 1 numerical control system
- 2 numerical control device
- 3 robot control device
- 20 machine tool
- 30 robot
- 31 storage unit
- 32 program input unit
- 33 analysis unit
- 37 system setting unit
- 39 data communication unit

The invention claimed is:

1. A robot control device comprising a processor, the processor is configured to execute functions of:

acquiring a robot control program for controlling a robot from a storage unit;

analyzing the robot control program that is inputted and acquiring a read command and a write command which are explicitly written in the robot control program and in which a variable of a numerical control program controlling a numerical control device and system information specifying a control system from a plurality of control systems possessed by the numerical control device are set;

outputting a command for reading and writing a variable of the control system based on the system information; and applying an update of the variable of the control system to be executed in the numerical control device, by transmitting a command for reading and writing the variable of the control system to the numerical control device, wherein the plurality of control systems each independently execute a predetermined operation on a workpiece.

2. The robot control device according to claim 1, wherein the analysis unit outputs a command to perform robot control so as to interlock with the plurality of control systems controlled by the numerical control device based on the variable of the control system which has been updated.

3. The robot control device according to claim 2, wherein each of the plurality of control systems machines a workpiece by controlling at least one among a tool post, a turret, a table and a spindle, and wherein at least one among the tool post, the turret, the table and the spindle is controlled based on the variable of the control system updated by the numerical control device.

4. The robot control device according to claim 1, wherein each of the plurality of control systems machines a workpiece by controlling at least one among a tool post, a turret, a table and a spindle, and wherein at least one among the tool post, the turret, the table and the spindle is controlled based on the variable of the control system updated by the numerical control device.

5. A numerical control system comprising:

a numerical control device having a plurality of control systems; and a robot control device which interlocks with the numerical control device to control a robot, wherein the robot control device includes a processor, the processor is configured to execute functions of:

acquiring a robot control program for controlling a robot from a storage unit;

analyzing the robot control program that is inputted and acquiring a read command and a write command which are explicitly written in the robot control program and in which a variable of a numerical control program controlling the numerical control device and system information specifying a control system from a plurality of control systems possessed by the numerical control device are set;

outputting a command for reading and writing a variable of the control system based on the system information; and transmitting a command for reading and writing a variable of the control system to the numerical control device, and wherein the numerical control device applies an update of the variable of the control system based on a command for reading and writing a variable of the control system received from the robot control device, wherein the plurality of control systems each independently execute a predetermined operation on a workpiece.

6. The numerical control system according to claim 5, wherein the analysis unit outputs a command to perform robot control so as to interlock with the plurality of control systems controlled by the numerical control device based on the variable of the control system which has been updated.

7. The numerical control system according to claim 6, wherein each of the plurality of control systems machines a workpiece by controlling at least one among a tool post, a turret, a table and a spindle, and wherein at least one among the tool post, the turret, the table and the spindle is controlled based on the variable of the control system updated by the numerical control device.

8. The numerical control system according to claim 5, wherein each of the plurality of control systems machines a workpiece by controlling at least one among a tool post, a turret, a table and a spindle, and wherein at least one among the tool post, the turret, the table and the spindle is controlled based on the variable of the control system updated by the numerical control device.

9. A numerical control method for interlock controlling a robot control device and a numerical control device with each other, the numerical control method comprising:

a program input step of acquiring a robot control program for controlling a robot from a storage unit;

an analysis step of analyzing the robot control program inputted in the program input step, and acquiring a read command and a write command which are explicitly written in the robot control program and in which a variable of a numerical control program controlling the numerical control device and system information specifying a control system from a plurality of control systems possessed by the numerical control device are set;

a system setting step of outputting a command for reading and writing a variable of the control system based on the system information acquired in the analysis step; and an updating step of the robot control device applying an update of a variable of the control system to be executed in the numerical control device, by transmitting a command for reading and writing the variable of the control system to the numerical control device, wherein the plurality of control systems each independently execute a predetermined operation on a workpiece.

* * * * *